United States Patent

[11] 3,609,481

[72] Inventor Lothar H. Brixner
West Chester, Pa.

[21] Appl. No. 724,899
[22] Filed Apr. 29, 1968
[45] Patented Sept. 28, 1971
[73] Assignee E. I. du Pont de Nemours and Company
Wilmington, Del.

[54] IRON SUBSTITUTED BARIUM TITANATE FERROELECTRIC COMPOSITIONS AND CAPACITORS COMPRISING SAME
2 Claims, 1 Drawing Fig.

[52] U.S. Cl. .......... 317/238, 317/258, 106/39
[51] Int. Cl. .......... H01g 3/06, C04b 35/00
[50] Field of Search .......... 252/62.9, 520, 62.3; 106/39; 317/238, 258

[56] References Cited

UNITED STATES PATENTS

| | | | |
|---|---|---|---|
| 3,268,783 | 8/1966 | Saburi .......... | 106/39 X |
| 3,426,251 | 2/1969 | Prokopowicz .......... | 317/258 X |

*Primary Examiner*—Tobias E. Levow
*Assistant Examiner*—J. Cooper
*Attorney*—Frank R. Ortolani

ABSTRACT: A ferroelectric composition of matter of the formula $$BaFe_xZ_{\frac{x}{2}}Ti_{1-\frac{3x}{2}}O_3$$

where $Z$ may be $W^{+6}$ or $Mo^{+6}$ and $x$ has a value from about 0.001 to about 0.03, having a tetragonally distorted perovskite crystal structure.

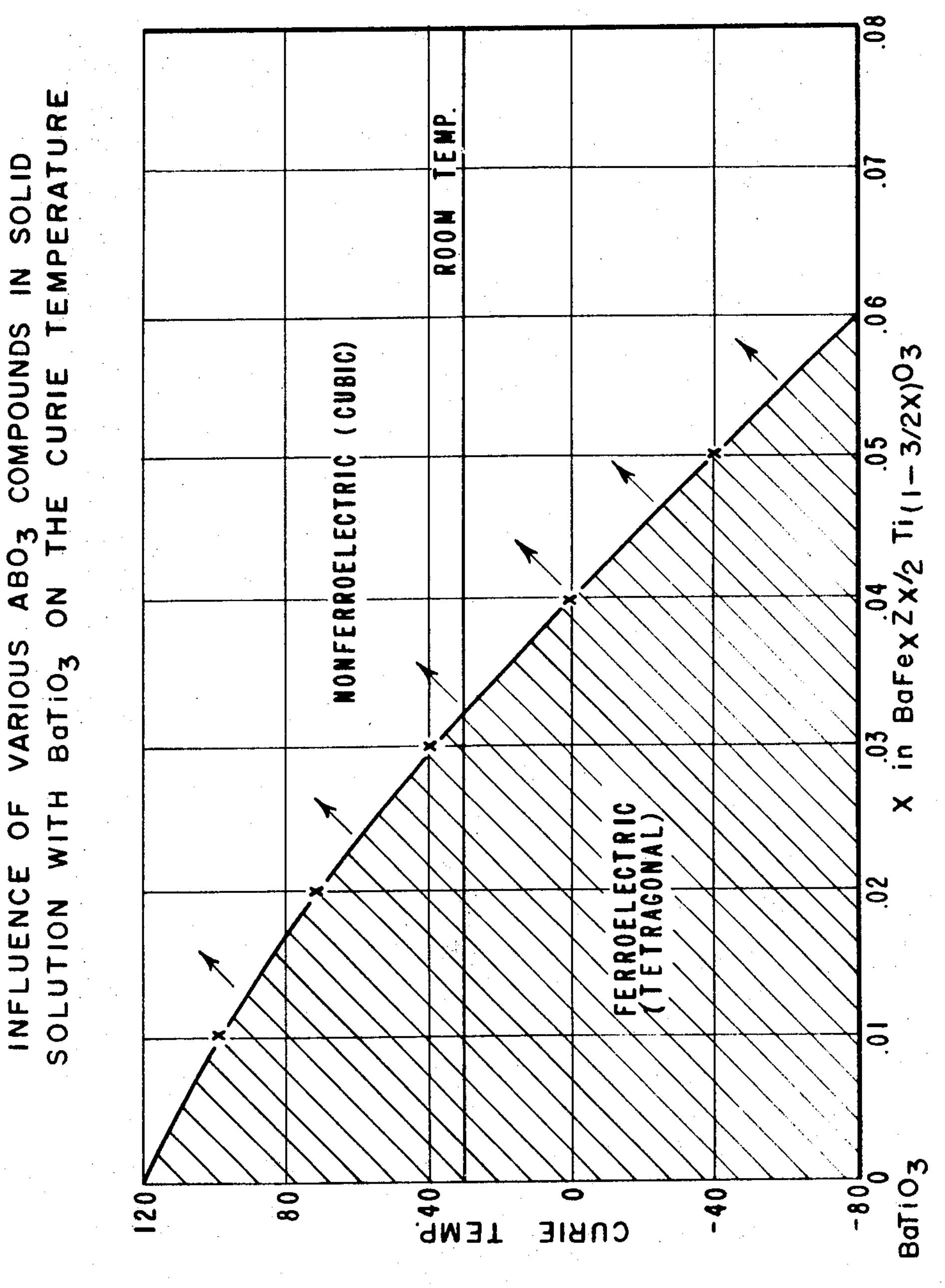
*INVENTOR*
LOTHAR H. BRIXNER

IRON SUBSTITUTED BARIUM TITANATE FERROELECTRIC COMPOSITIONS AND CAPACITORS COMPRISING SAME

BACKGROUND OF THE INVENTION

Compositions, known in the art, having a perovskite crystal structure, $ABO_3$, are exemplified by calcium titanate, $CaTiO_3$, and barium titanate, $BaTiO_3$. Compounds of this class which include other compounds having an element of the +2 valence state in the A position, such as $Pb^{+2}$, have been useful for their piezoelectric properties. To improve the piezoelectric properties, elements have been substituted into the B position of the crystal structure to form solid solutions as disclosed in U.S. Pat. No. 2,708,244 in which zirconium is substituted into the lead titanate crystal structure or in U.S. Pat. No. 2,849,404 in which zirconium and tin are substituted into the lead titanate crystal structure.

SUMMARY OF THE INVENTION

A ferroelectric composition of matter is provided which has the formula $$BaFe_xZ_{\frac{x}{2}}Ti_{1-\frac{3x}{2}}O_3$$

where Z may be $W^{+6}$ or $Mo^{+6}$ and $x$ has a value from about 0.001 to about 0.03, and a tetragonally distorted perovskite crystal structure.

BRIEF DESCRIPTION OF THE DRAWING

In the drawing which will aid in understanding of the invention Curie temperature is plotted as the ordinate against the value of $x$ in the formula of the compound of the present invention as abscissa.

The following examples are offered to further illustrate the invention. All reactant weights are calculated stoichiometrically from the equation:

$$2BaCO_3+\frac{x}{2}Fe_2O_3+{}_xZO_3+(2\text{-}3x)TiO_2 \rightarrow 2BaFe_xZ_{\frac{x}{2}}Ti_{1-\frac{3x}{2}}O_3+2CO_2$$

The examples are for illustrative purposes only and are not meant to limit the invention in any manner.

The compositions are prepared by standard ceramic techniques. The ceramic discs are fitted with firmly attached electrodes of Ag, Au, Pd, or Pt and tested for their electrical properties. In this form, they are capacitors which are useful in electronic equipment. The electrodes used in the following examples are Ag.

EXAMPLE 1

After weighing out 0.0404 grams $Fe_2O_3$, 0.0583 grams $WO_3$, 3.9870 grams $TiO_2$, and 10.0000 grams $BaCO_3$, these reactants are well mixed and fired at a temperature of 900°–1,000° C. under ambient pressure in air for 8–14 hours. The product of this firing is ball-milled under acetone, dried and pressed into pellets of about 1 inch in diameter. These pellets are subjected to a second firing at 1,000°–1,400° C. in air. Each of the pellets is then fitted with firmly attached electrodes and the electrical properties of this product A, are measured. The experiment is repeated using 0.0809 grams $Fe_2O_3$, 0.1175 grams, $WO_3$, 3.9267 grams $TiO_2$, and 10.0000 grams $BaCO_3$. This product is labeled B. The experiment is again repeated using 0.1214 grams $Fe_2O_3$, 0.1762 grams $WO_3$, 3.8660 grams $TiO_2$, and 10.0000 grams $BaCO_3$. This product is labeled C. A printed capacitor using the product C of this example mixed with 5 weight percent glass-forming components is prepared and measured for dielectric constant. A dense ceramic capacitor of product C is prepared and measured for dielectric constant. Barium titanate, a commercially available and widely used ferroelectric material, is tested under identical conditions for dielectric constant and a dense ceramic capacitor of pure $BaTiO_3$, is also tested for dielectric constant. THe dielectric constant measure for the three products of this example, $BaTiO_3$, and the three capacitors is given in table I.

TABLE I

| Product | Formula | Dielectric Constant (K) at 1 kHz. |
|---|---|---|
| A | $BaFe_{0.01}W_{0.005}Ti_{0.985}0_3$ | 683 |
| B | $BaFe_{0.02}W_{0.01}Ti_{0.97}0_3$ | 744 |
| C | $BaFe_{0.03}W_{0.015}Ti_{0.955}0$ | 1303 |
| | $BaTi0_3$ | 800 |
| | Printed Capacitor of C | 1150 |
| | Ceramic Capacitor of C | 5693 |
| | Ceramic Capacitor of $BaTi0_3$ | 2049 |

EXAMPLE 2

The following reactants are mixed, fired and tested as described in example 1: Product A, 0.405 grams $Fe_20_3$, 0.0365 grams $Mo0_3$, 3.9875 grams $Ti0_2$, and 10.0000 grams $BaC0_3$; Product B, 0.0809 grams $Fe_20_3$, 0.0729 grams $Mo0_3$, 3.9267 grams $Ti0_2$, and 10.0000 grams $BaC0_3$. The results are shown in table II.

TABLE II

| Product | Formula | Dielectric Constant (K) at 1 kHz. |
|---|---|---|
| A | $BaFe_{0.01}Mo_{0.005}Ti_{0.0985}0_3$ | 592 |
| B | $BaFe_{0.02}Mo_{0.01}Ti_{0.97}0_3$ | 497 |

EXAMPLE 3

The following reactants are mixed, fired and tested as in example 1: Product A, 0.0405 grams $Fe_20_3$, 0.0294 grams $W0_3$, 0.0182 grams $Mo0_3$, 3.9875 grams $Ti0_2$, and 10.000 grams $BaC0_3$; Product B, 0.0809 grams $Fe_20_3$, 0.0587 grams $w0_3$, 0.0365 grams $MoO_3$, 3.9270 grams $Ti0_2$, and 10.0000 grams $BaC0_3$; Products C, 0.1214 grams $Fe_20_3$, 0.0881 grams $W0_3$, 0.0547 grams $Mo0_3$, 3.8660 grams $Ti0_2$, and 10.0000 grams $BaC0_3$. The results are shown in table III.

TABLE III

| Product | Formula | Dielectric constant (K) at 1 kHz. |
|---|---|---|
| A | $BaFe_{.01}W_{0.0025}Mo_{0.0025}Ti_{0.985}O_3$ | 458 |
| B | $BaFe_{0.02}W_{0.005}Mo_{0.005}Ti_{0.97}O_3$ | 501 |
| C | $BaFe_{0.03}W_{0.0075}Mo_{0.0075}Ti_{0.95}O_3$ | 466 |

The new composition of the general formula $ABO_3$ is obtained by substituting $Fe^{+3}$ ions into the B position of the crystal lattice of $BaTi0_3$ to replace some of the body-centered $Ti^{+4}$ ions. To retain the electroneutrality of the compound, small amounts of $W^{+6}$ or $Mo^{+6}$ are simultaneously substituted into the B position of the crystal lattice.

The resultant crystalline material is single phase, that is, none of the constituent components are in evidence in the new compound. The lattice is slightly distorted along its longitudinal axis. Typical parameter of the crystal lattice are: $A_t$=3.998 angstroms and $C_t$=4.030 angstroms, with a C/A ratio equal to 1.008.

At the Curie temperature, that is, the temperature at which the ferroelectric properties of the material disappear, the crystal lattice changes from its distorted tetragonal configuration to a cubic configuration where $A_t$=$C_t$. The Curie temperature decreases as the amount of iron and molybdenum or tungsten in the crystal lattice is increased. The drawing is a plot of decreasing Curie temperature as the amount of iron and molybdenum or tungsten, designated as $x$ in the formula $$BaFe_xZ_{\frac{x}{2}}Ti_{1-\frac{3x}{2}}O_3$$

is increased. The shaded region below the curve is the region in which the composition assumes the distorted tetragonal configuration and exhibits ferroelectric properties. The region above the curve is the region in which the composition assumes the cubic configuration in the crystal lattice and exhibits nonferroelectric properties. A line designating room temperature is drawn on the graph because the area above the room temperature line and within the shaded area of the tetragonal configuration is particularly useful. It can be seen that the room temperature line intersects the curve of the Curie temperatures at a point corresponding to $x$ equals 0.03. In the formula $x$ may be as small as 0.001 and while it may be large as indicated in the drawing, compounds with smaller values are preferred. The preferred compounds are those compounds with an $x$ value equal to 0.03 down to 0.001.

The compound of the invention exhibits excellent ferroelectric properties and is, therefore, useful as capacitors and transducers where a high dielectric constant is desired.

Since the dielectric constant of the compound of this invention tends to change only slightly as the temperature approaches the Curie temperature, the capacitors made from the composition are stable over a wide temperature range and are, therefore, very desirable in the use of electronic equipment such as radios, televisions, satellites, and missiles.

Many equivalent modifications will be apparent to those skilled in the art from a reading of the above disclosure without departing from the inventive concept.

I claim:

1. A ferroelectric composition of matter having a tetragonally distorted perovskite crystal structure of the formula $BaFe_{0.03}W_{0.015}Ti_{0.955}0_3$ 2. A capacitor comprising:

a. at least one pair of electrodes; and b. a dielectric layer of the matter of claim 1 between said pair of electrodes.

PO-1050 (5/69)

UNITED STATES PATENT OFFICE
CERTIFICATE OF CORRECTION

Patent No. 3,609,481 Dated September 28, 1971

Inventor(s) Lothar Brixner

It is certified that error appears in the above-identified patent and that said Letters Patent are hereby corrected as shown below:

Column 2, line 6, "$BaFc_{0.01}W_{0.005}Ti_{0.985}O_3$" should read -- $BaFe_{0.01}W_{0.005}Ti_{0.985}O_3$ --; column 2, line 7, "$BaFc_{0.02}W_{0.01}Ti_{0.97}O_3$" should read -- $BaFe_{0.02}W_{0.01}Ti_{0.97}O_3$ --; column 2, line 8, "$BaFe_{0.03}W_{0.015}Ti_{0.955}O$" should read -- $BaFe_{0.03}W_{0.015}Ti_{0.955}O_3$ --; column 2, line 29, "$BaFc_{0.01}Mo_{0.005}Ti_{0.0985}O_3$" should read -- $BaFe_{0.01}Mo_{0.005}Ti_{0.985}O_3$ --; column 2, line 38, "$wO_3$" should read -- $WO_3$ --; column 2, line 40, "Products C" should read -- Product C --.

Signed and sealed this 14th day of November 1972.

(SEAL)
Attest:

EDWARD M.FLETCHER,JR.
Attesting Officer

ROBERT GOTTSCHALK
Commissioner of Patents